(12) United States Patent
Wieker et al.

(10) Patent No.: US 12,299,677 B2
(45) Date of Patent: May 13, 2025

(54) METHODS AND SYSTEMS FOR BINDING ENTITY-RESTRICTED ACCESS TOKENS

(71) Applicant: Capital One Services, LLC, McLean, VA (US)

(72) Inventors: Jeffrey Carlyle Wieker, Falls Church, VA (US); Pavel Fort, Westbury, NY (US)

(73) Assignee: Capital One Services, LLC, McLean, VA (US)

( * ) Notice: Subject to any disclaimer, the term of this patent is extended or adjusted under 35 U.S.C. 154(b) by 176 days.

(21) Appl. No.: 17/716,802

(22) Filed: Apr. 8, 2022

(65) Prior Publication Data
US 2023/0325818 A1    Oct. 12, 2023

(51) Int. Cl.

| | |
|---|---|
| G06Q 20/00 | (2012.01) |
| G06F 18/214 | (2023.01) |
| G06F 21/31 | (2013.01) |
| G06F 21/33 | (2013.01) |
| G06Q 20/38 | (2012.01) |
| G06Q 20/40 | (2012.01) |

(52) U.S. Cl.
CPC ....... *G06Q 20/3821* (2013.01); *G06F 18/214* (2023.01); *G06F 21/316* (2013.01); *G06F 21/335* (2013.01); *G06Q 20/401* (2013.01)

(58) Field of Classification Search
None
See application file for complete search history.

(56) References Cited

U.S. PATENT DOCUMENTS

| | | | | |
|---|---|---|---|---|
| 11,457,079 | B1* | 9/2022 | Mehta | H04L 63/10 |
| 11,721,336 | B1* | 8/2023 | Toren | H04L 51/42 |
| | | | | 704/270.1 |
| 2011/0239283 | A1* | 9/2011 | Chern | H04L 9/3213 |
| | | | | 726/6 |
| 2013/0047195 | A1* | 2/2013 | Radhakrishnan | H04L 63/105 |
| | | | | 726/1 |
| 2013/0047205 | A1* | 2/2013 | Radhakrishnan | G06F 21/335 |
| | | | | 726/1 |
| 2013/0047214 | A1* | 2/2013 | Radhakrishnan | G06F 21/335 |
| | | | | 726/4 |

(Continued)

OTHER PUBLICATIONS

Chen; Identity, Authentication and Authorization in Forestry 4.0; IEEE; 6 pages; 2022.*

(Continued)

*Primary Examiner* — Radu Andrei
(74) *Attorney, Agent, or Firm* — Foley & Lardner LLP

(57) ABSTRACT

In some embodiments, an entity-restricted access token may be bound to an entity set. In some embodiments, use of an entity-restricted access token may be detected for an action related to a first entity. Based on the detected use of the token, a plurality of entity sets associated with the first entity may be determined, and a notification (e.g., requesting selection from among the entity sets) may be presented to a mobile device of a user. Based on the user selection obtained via the notification, the token may be bound to the user-selected entity set such that subsequent use of the entity-restricted access token is restricted to actions related to entities of the user-selected entity set (e.g., the first entity and one or more additional entities related to the first entity).

20 Claims, 4 Drawing Sheets

(56) References Cited

U.S. PATENT DOCUMENTS

| | | | | |
|---|---|---|---|---|
| 2013/0047266 | A1* | 2/2013 | Radhakrishnan | H04L 63/105 726/28 |
| 2013/0074167 | A1* | 3/2013 | Bailey | G06F 21/41 726/8 |
| 2014/0122204 | A1* | 5/2014 | Hills | G06Q 30/0222 705/14.23 |
| 2017/0140174 | A1* | 5/2017 | Lacey | G06Q 20/4016 |
| 2017/0270517 | A1* | 9/2017 | Vasu | G06Q 20/4018 |
| 2018/0300471 | A1* | 10/2018 | Jain | H04L 63/105 |
| 2020/0137634 | A1* | 4/2020 | Greene | G06Q 20/3821 |
| 2020/0151724 | A1* | 5/2020 | Edwards | G06Q 20/38215 |
| 2021/0295332 | A1* | 9/2021 | Al-Bedaiwi | H04L 67/53 |
| 2021/0314329 | A1* | 10/2021 | Joshi | H04L 63/0876 |
| 2021/0368313 | A1* | 11/2021 | Sharifi | H04W 4/60 |
| 2022/0019995 | A1* | 1/2022 | Ngo | G06Q 20/385 |
| 2022/0029808 | A1* | 1/2022 | Angel | H04L 63/1466 |
| 2022/0353296 | A1* | 11/2022 | Louie | G06N 20/00 |

OTHER PUBLICATIONS

Naik; Securing digital identities in the cloud; MoD UK; 12 pages; 2017.*

International Search Report and Written Opinion mailed Aug. 10, 2023, in corresponding International Application No. PCT/US2023/017662.

\* cited by examiner

US 12,299,677 B2

METHODS AND SYSTEMS FOR BINDING ENTITY-RESTRICTED ACCESS TOKENS

BACKGROUND

Access tokens enable users to access resources of one or more entities. For instance, in the context of web services, in response to a user logging in to a web service of an entity via a user device, the web service may issue a token (e.g., JSON web token or other token) to the user device. Each subsequent request of the user device to the web service will include the token, allowing the user to access services and other resources that are permitted with that token. In one use case, where the web service is a content aggregation platform, the token would enable the user to access resources of many different third-party entities, subject to the user's account with the aggregation platform already having the corresponding access rights.

SUMMARY

Methods and systems are described herein for improvements related to entity-restricted access tokens (or other tokens) and uses thereof. As one example, methods and systems are described herein for generating one or more entity-restricted access tokens for a user (e.g., issued to the same account of the user), where each such token is configured to bind to a set of entities in connection with use of the token for an action related to a third-party entity of the entity set (e.g., such that use of the token is restricted to the entities bound to the token).

As discussed above, in the context of a conventional content aggregation platform, in response to a user logging in to the aggregation platform via a user device, the aggregation platform issues a token to the user device that enables the user device to access any content within the full scope of permissions assigned to the user's account. Such access may, for example, include access to resources of many different third-party entities without the user having to manually log in to the aggregation platform for each access request from the user device. The aggregation platform may also issue to the user one or more pre-bound entity-restricted access tokens that enables the user to access certain "enhanced" resources of a given third-party entity when the corresponding pre-bound token associated with the third-party entity is invoked by the user device. A poor user experience occurs, however, when the user reasonably expects the pre-bound token associated with the third-party entity to be compatible for accessing resources of a related, but different, third-party entity (e.g., an affiliated entity) and instead receives an error notification when attempting to invoke the pre-bound token to access the resources of the related third-party entity with which the configuration of the pre-bound token is incompatible.

To overcome this, in some embodiments, prior to binding an entity-restricted access token to one or more entities, the system may detect use of the token for an action related to a first entity (e.g., where the token has a null entity value for an entity parameter of the token). In response to such detection, the system may prompt the user to select an entity set from among a plurality of entity sets (to which the token is to be bound) and bind the token to the user-selected entity set based on the user selection. As an example, the user-selected entity set may include the first entity (e.g., for which use of the token was detected) and one or more additional entities related to the first entity. In this way, for example, because the token is bound based on the detected use, and the user selects the entity set for the token in connection with the detected use, the token may be configured for use in accordance with the user's reasonable expectations, thereby decreasing the likelihood of future incompatibility or other error notifications with respect to the user's use of the token.

In some embodiments, after the binding of the token to the user-selected entity set associated with the first entity, the system may obtain a request to use the token for a network operation of the user with a second entity that is not part of any of the plurality of entity sets. When the system performs the validation process for the network operation, the validation process may indicate that the network operation is invalid (e.g., the token is incompatible for the requested network operation). The system may then store an indication of a network operation error related to the user-selected entity set and update the plurality of entity sets associated with the first entity based on the stored indication. As such, for example, post-binding uses of the token (e.g., including uses of the token that result in network errors) may be used to update the plurality of entity sets associated with the first entity (e.g., so that the entity sets available for selection by one or more users in connection with future detected uses of tokens for actions related to the first entity may better reflect the users' expectations for the token).

Various other aspects, features, and advantages of the invention will be apparent through the detailed description of the invention and the drawings attached hereto. It is also to be understood that both the foregoing general description and the following detailed description are examples and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise.

DETAILED DESCRIPTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
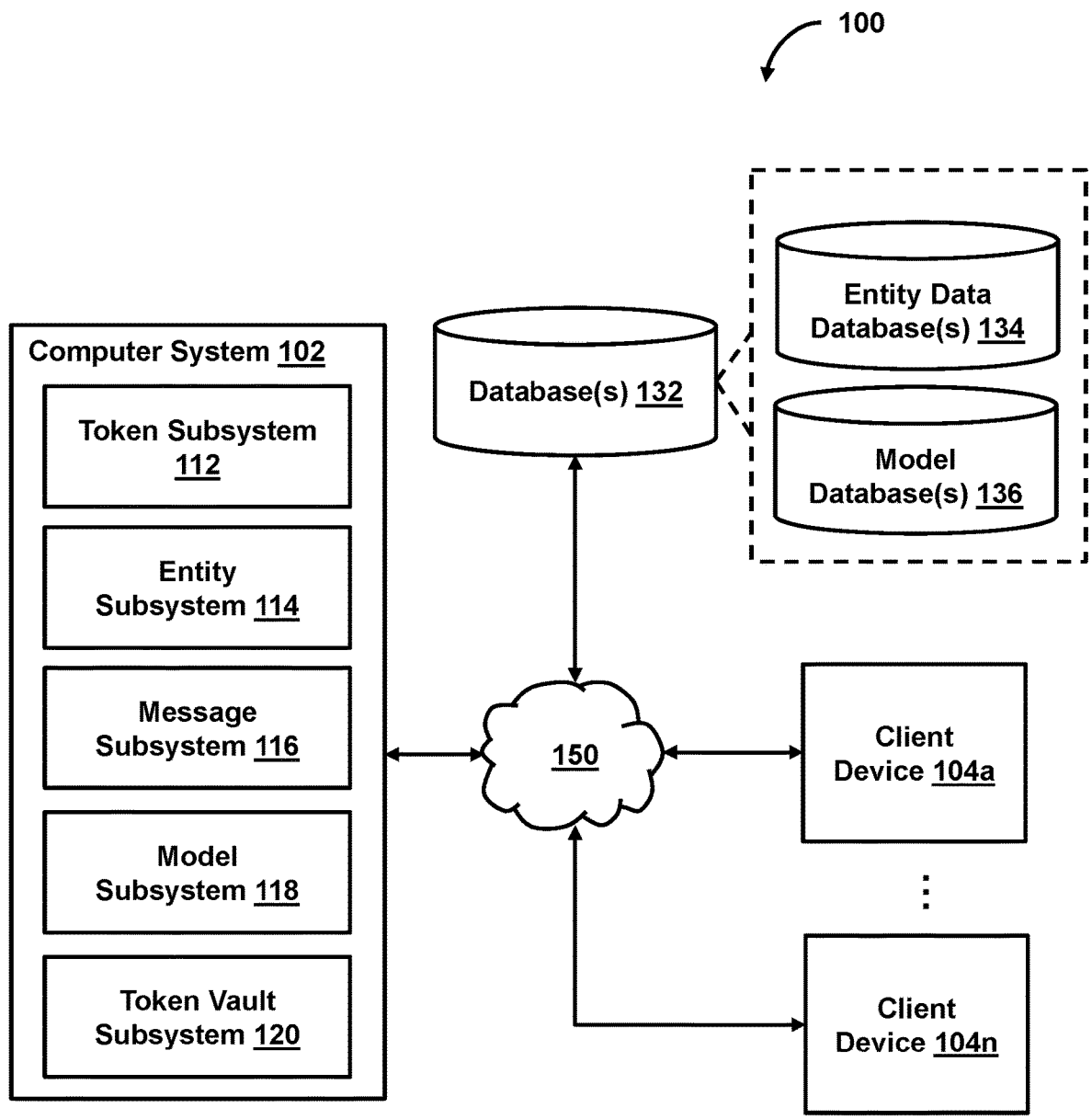
FIG. 1 shows a system for facilitating use of entity-restricted access tokens, in accordance with one or more embodiments.

FIG. 1 shows a system 100 for facilitating use of entity-restricted access tokens, in accordance with one or more embodiments. As shown in FIG. 1, system 100 may include computer system 102, client device 104 (or client devices 104a-104n), or other components. Computer system 102 may include token subsystem 112, entity subsystem 114, message subsystem 116, model subsystem 118, token vault subsystem 120, or other components. Each client device 104 may include any type of mobile terminal, fixed terminal, or other device. By way of example, client device 104 may include a desktop computer, a notebook computer, a tablet computer, a smartphone, a wearable device, or other client device. Users may, for instance, utilize one or more client devices 104 to interact with one another, one or more servers, or other components of system 100. It should be noted that, while one or more operations are described herein as being performed by particular components of computer system 102, those operations may, in some embodiments, be performed by other components of computer system 102 or other components of system 100.

As an example, while one or more operations are described herein as being performed by components of computer system 102, those operations may, in some embodiments, be performed by components of client device 104. It should be noted that, although some embodiments are described herein with respect to machine learning models, other prediction models (e.g., statistical models or other analytics models) may be used in lieu of or in addition to machine learning models in other embodiments (e.g., a statistical model replacing a machine learning model and a non-statistical model replacing a non-machine learning model in one or more embodiments).

In some embodiments, system 100 may bind one or more related entities to a token such that subsequent use of the token is restricted to those entities bound to the token. As an example, the token may be any token that allows the performance of one or more actions, limited to entities that are bound to the token. For instance, related entities may be entities that are owned by another entity, entities that use the same credentials (e.g., login credentials) as another entity, entities that have access to the same or similar information as another entity, entities that are a derivative of another entity, entities that provide a similar service as another entity, entities that partially own another entity, or entities that are otherwise associated with another entity. System 100 may (i) detect the use of the token for an action related to a first entity, (ii) determine other entities that are associated with the first entity, and (iii) bind the first entity and the other related entities to the token.

In some embodiments, system 100 may detect use of a token for an action related to a first entity and may determine entities that are related to the first entity. For instance, an action may be any interaction that a user, computing system, or service may have with an entity with which the token is being used. As an example, based on the foregoing detection, system 100 may prompt the user to select an entity set from among a plurality of entity sets (to which the token is to be bound) and bind the token to the user-selected entity set based on the user selection. As an example, the user-selected entity set may include the first entity (e.g., for which use of the token was detected) and one or more additional entities related to the first entity. In this way, for example, because the token is bound based on the detected use, and the user selects the entity set for the token in connection with the detected use, the token may be configured for use in accordance with the user's reasonable expectations, thereby decreasing the likelihood of future incompatibility or other error notifications with respect to the user's use of the token.

In some embodiments, after the binding of the token to the user-selected entity set associated with the first entity, system 100 may obtain a request to use the token for an interaction of the user with a second entity that is not part of any of the plurality of entity sets. When the system performs the validation process for the interaction, the validation process may indicate that the interaction is invalid (e.g., the token is incompatible for the requested interaction). The system may then store an indication of an error (e.g., a network error) related to the user-selected entity set and update the plurality of entity sets associated with the first entity based on the stored indication. As such, for example, post-binding uses of the token (e.g., including uses of the token that result in network errors) may be used to update the plurality of entity sets associated with the first entity (e.g., so that the entity sets available for selection by one or more users in connection with future detected uses of tokens for actions related to the first entity may better reflect the users' expectations for the token).

Subsystems 112-116

In some embodiments, token subsystem 112 may detect use of an entity-restricted access token for an action related to a first entity. For example, the action may be any interaction that a user, computing system, or service may have with an entity with which the entity-restricted access token is being used. For instance, the action may be logging in to an account, accessing account information, selecting an item, paying for an item, clicking on an object, navigating to a webpage, streaming multimedia content, or any other action that may be performed while using the entity-restricted access token. Additionally, an entity may be a company, merchant, service provider, organization, or other entity. In some embodiments, the entity-restricted access token may include entity parameters. For example, each entity that is bound to an entity-restricted access token may include a set of entity parameters. The entity parameters may include an entity identifier (e.g., an entity name, a numerical value, an alphanumeric string, etc.), an expiration parameter (e.g., a date/time when the entity-restricted access token may be used with a respective entity, a date/time range when the entity-restricted access token may be used with a respective entity, etc.), one or more entity values (e.g., an internet protocol (IP) address, phone number, zip code, alphanumeric string, integers, etc.), or other parameters. In this way, an entity-restricted access token may not merely be bound to a single entity, but may include a plurality of entities that are bound to the entity-restricted access token. It should be noted that, although embodiments are described herein with respect to an entity-restricted access token, it is contemplated that one or more other types of tokens may be used in lieu of the entity-restricted access token in other embodiments.

Figure 2:
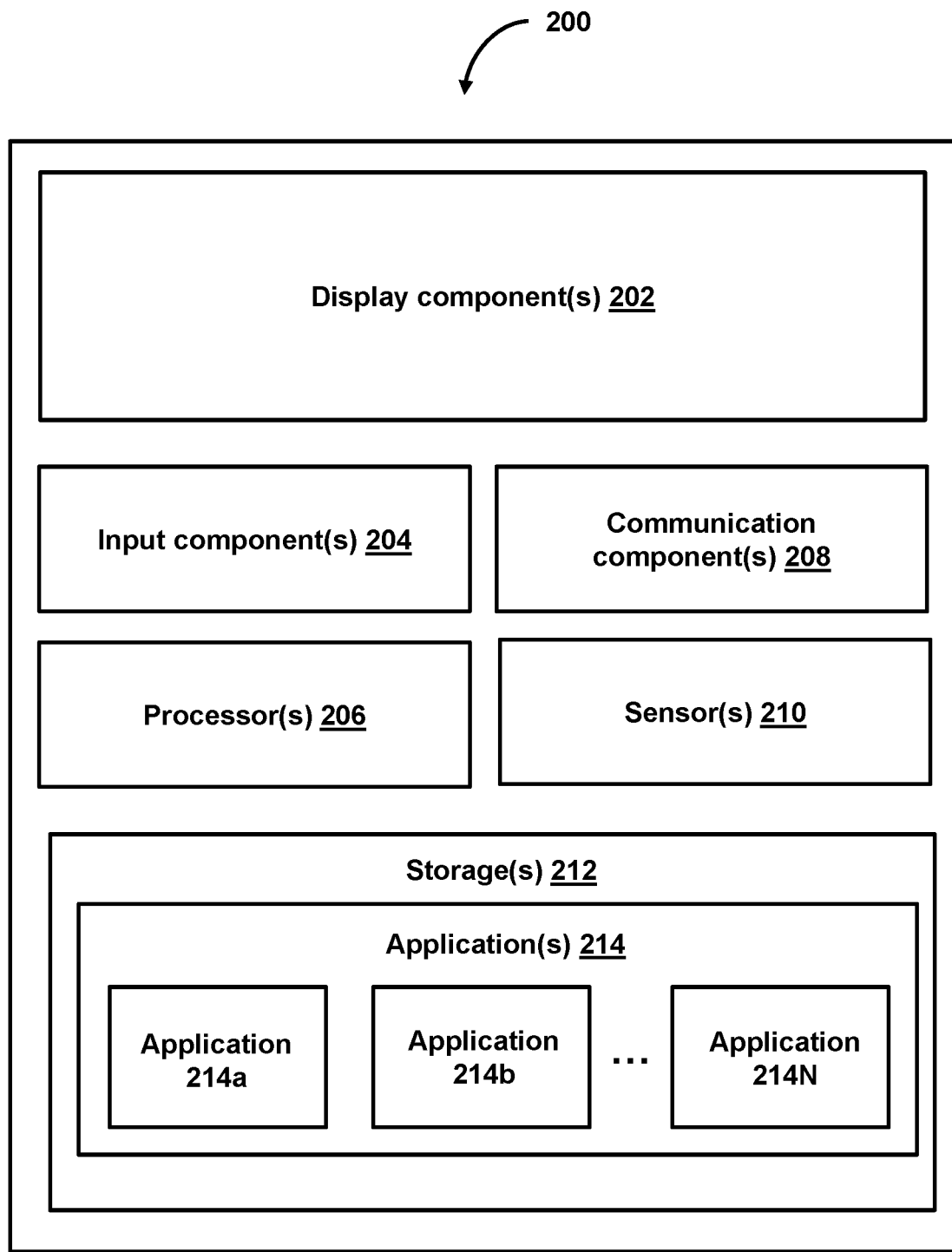
FIG. 2 shows a client device, in accordance with one or more embodiments.

In some embodiments, with respect to FIG. 2, one or more operations related to a token generation and authentication system for binding entity-restricted access tokens to an entity set may be performed by client device 200. In some embodiments, client device 200 may correspond to client device 104 (FIG. 1). Client device 200 may include a plurality of components, such as display component(s) 202, input component(s) 204, processor(s) 206, communication component(s) 208, sensor(s) 210, storage(s) 212, application(s) 214, or other components. In some embodiments, storage 212 may store a variety of applications. For example, applications 214a-214n may represent different applications stored on client device 200. As another example, application 214 may be an application that is configured as a web browser for interacting with one or more entities over network 150. For instance, application 214 may be configured to allow a user to perform one or more actions using an entity-restricted access token, consistent with one or more embodiments. As another example, communication components 208 may be configured for receiving one or more messages (e.g., text messages, emails, notifications, mobile notifications, etc.) that may be displayed to a user via display components 202, in accordance with one or more embodiments.

Referring back to FIG. 1, in one use case, a user may navigate to a website that is associated with an entity. However, the website the user navigates to may be associated with an entity that is not currently bound to an access token (e.g., being used to interact with the website) or that is not related to any entities that are bound to a previously generated entity-restricted access token. Therefore, token subsystem 112 may generate a new entity-restricted access token for interacting with the website that is associated with the entity. For example, in some embodiments, token subsystem 112 may generate an entity-restricted access token having null entity parameters (e.g., a null entity identifier, expiration parameter, entity values, etc.). To ensure that the user is still able to interact with the website (e.g., perform one or more actions), token subsystem 112 may generate an entity value (e.g., an IP address) such that the entity-restricted access token may be used to interact with the website with which the entity is associated. However, token subsystem 112 may keep the entity parameter set to a null value because the user has not yet indicated whether the entity associated with the website is to be bound to the entity-restricted access token, thereby conserving computer memory. Token subsystem 112 may use the newly generated entity-restricted access token for any actions a user may invoke when interacting with the entity associated with the website. For example, a user may perform a network operation (e.g., logging in to the website to gain access to user account information of the entity) where the entity-restricted access token is being used. In some embodiments, token subsystem 112 may detect the use of the entity-restricted access token having a null entity parameter. For example, token subsystem 112 may detect that the entity-restricted access token has a null entity identifier (e.g., due to the entity associated with the website not being currently bound to the entity-restricted access token).

In another use case, token subsystem 112 may detect that a user has navigated to a website associated with an entity and may determine whether the entity is bound to the entity-restricted access token currently being used or is bound to another previously generated entity-restricted access token. If the entity is bound to the entity-restricted access token currently being used, token subsystem 112 may perform any subsequent actions with the entity-restricted access token. However, if the entity is not bound to the entity-restricted access token currently being used, token subsystem 112 may determine whether the entity is bound to another entity-restricted access token. For example, token subsystem 112 may interact with token vault subsystem 120 to determine whether a previously generated entity-restricted access token to which the entity is bound is available for use. For instance, token vault subsystem 120 may store a plurality of entity-restricted access tokens in one or more computer-based storages. Token subsystem 112 may provide an entity identifier (e.g., obtained via a parsing of the webpage, URL, domain name, a Natural Language Processing (NLP) technique, etc.) to token vault subsystem 120 to determine whether the entity is currently bound to a previously generated entity-restricted access token. Based on token subsystem 112 determining that the entity is bound to a previously generated entity-restricted access token, token subsystem 112 may select the entity-restricted access token from token vault subsystem 120 that has the entity bound to be used when interacting with the website that is associated with the entity. Thus, any action (or interaction) that may subsequently occur with the entity associated with the website may be conducted by using the selected entity-restricted access token, thereby decreasing the amount of computer processing resources that may be required to generate a new entity-restricted access token.

In yet another use case, a user may attempt to pay for an item through a merchant. For example, where the entity-restricted access token is a virtual card number, the user may attempt to purchase an item from a merchant using the virtual card number. Token subsystem 112 may determine that the virtual card is being used to purchase an item associated with the merchant, and may determine whether the merchant is bound to the virtual card number or not. Based on determining that the merchant is bound to the virtual card number, token subsystem 112 may allow the transaction (e.g., cause performance of the action that is related to the merchant). Alternatively, if token subsystem 112 determines that the merchant is not currently bound to the virtual card number (e.g., causing a network operation error), as will be discussed later, token subsystem 112 may deny the transaction, prevent the user from using the virtual card number with the merchant, or present a message to the user asking whether the user would like to bind the merchant (or other associated merchants) to the virtual card number. However, because users typically want the virtual card number (or other entity-restricted access token) to work with other associated merchants (or entities), token subsystem 112 may determine a set of merchants (or other entities) that are associated with the merchant with which the user is currently attempting to complete a transaction.

In some embodiments, entity subsystem 114 may determine a first entity set associated with a first entity, wherein the first entity set comprises the first entity. For instance, the first entity set may include the first entity (e.g., the entity that the user is currently interacting with) and other entities that are associated with the first entity. For example, the other entities that are associated with the first entity may be entities that are owned by the first entity, entities that own the first entity, entities that use the same login credentials as the first entity, entities that have access to the same or similar information as the first entity, entities that are a derivative of the first entity, or entities that are otherwise associated with first entity. In some embodiments, entity subsystem 114 may determine a plurality of entity sets associated with the first entity, where at least one entity of the entity sets includes the first entity. In this way, as later described, the user may have multiple options to bind multiple sets of entities that are related to the first entity, thereby further improving the user experience.

As an example, as a user interacts with an entity, entity subsystem 114 may determine one or more entity parameters associated with the entity. For instance, entity subsystem 114 may identify an entity identifier associated with the entity. The entity identifier may include an entity name, a numerical value that identifies the entity, an alphanumeric string that identifies the entity, or other entity identifier. In a use case, entity subsystem 114 may identify the entity (e.g., the entity identifier) based on a URL, parsing a webpage, NLP of the webpage, or other method. Once entity subsystem 114 identifies the entity, entity subsystem 114 may provide the entity identifier to one or more databases storing entity information. For example, entity subsystem 114 may provide the entity identifier to entity data database 134, where entity data database 134 stores entity information.

Entity data database 134 may include entity information. For example, entity data database 134 may include one or more files, spreadsheets, data structures, dictionaries, or key-value pairs that store entity-related information such as entity parameters, entity association information, or other entity-related information. As an example, the entity association information may be data related to which entities are associated with one another. For example, the entity association information may be obtained via publicly available documents (e.g., acquisition and merger forms), web-based articles including information on associated entities, user feedback, or other available entity association information. In some embodiments, entity association information may be based on user feedback data. For example, the user feedback data may include information related to entities that are associated with one another, sets of entities that are associated with a particular entity, entities that are not associated with one another, entity sets that are not associated with a particular entity, values of previous user selections of entities that are associated with one another, values of previous user selections of entity sets that are associated with one another, values of previous user selections of entities that are not related to one another, values of previous user selections of entity sets that are not related to one another, or other entity association information derived from user feedback. For instance, the values may include a number, a percentage, a ratio, or other metric for measuring previous user selections of associated or non-associated entities. In some embodiments, as will be explained later, entity data database 134 may be used to train one or more machine learning models.

In some embodiments, a first entity set associated with a first entity may be determined based on a value of previous user selections of the first entity set satisfying a selection threshold value. For example, entity subsystem 114 may determine an entity identifier of the first entity a user is interacting with (e.g., performing an action with) based on the first entity. For example, where the first entity is associated with a website, entity subsystem 114 may determine the entity identifier based on the URL of the website. Entity subsystem 114 may provide the entity identifier to entity data database 134 to query for candidate entity sets that are associated with the first entity. Entity data database 134 may then return candidate entity sets that are associated with the first entity. In some embodiments, the candidate entity sets each include a set of associated entities, and at least one of the candidate entity sets may include the first entity with other associated entities. Entity subsystem 114 may identify, for each of the candidate entity sets, a value of previous user selections of the candidate entity set. For example, the value of previous user selections may be a number, percentage, ratio, or other metric used to measure previous user selections of a candidate entity set. Entity data database 134 may determine, for each of the candidate entity sets, whether the value of previous user selections of the candidate entity set satisfies a selection threshold value. For example, the selection threshold value may be a number, percentage, integer, ratio, number range, percentage range, integer range, ratio range, or other threshold value. Entity subsystem 114 may determine the first entity set (or plurality of first entity sets) in response to the value of previous user selections satisfying the selection threshold value for each candidate entity set. For example, the selection threshold value may be satisfied if the value of previous user selections meets or exceeds the selection threshold value, is within a range of the selection threshold value, etc. For instance, where the selection threshold value is a number (e.g., number of previous selections), entity subsystem 114 may determine the first entity set associated with the first entity by selecting a candidate entity set that meets or exceeds the number of previous user selections. As another example, where the selection threshold metric is a number range (e.g., a range of previous user selections), entity subsystem 114 may determine the first entity set associated with the first entity by selecting a candidate entity set that is within the number of previous user selections.

As an example, where the entity-restricted access token is a virtual card number, token subsystem 112 may detect that a user is attempting to purchase an item from a merchant with the virtual card number. Entity subsystem 114 may identify the merchant via an entity identifier (e.g., a URL, NLP, domain name, etc.) and may provide the entity identifier to entity data database 134. Entity subsystem 114 may retrieve candidate entity sets from entity data database 134, where at least one of the candidate entity sets includes the merchant with which the user is interacting and other merchants that are related to the merchant. Entity subsystem 114 may then determine which candidate entity sets satisfy a previous user-selection threshold value. Based on such determination, entity subsystem 114 may determine entity sets that are associated with the first entity based on the respective candidate entity sets satisfying the previous user-selection threshold value. As an example, each candidate entity set that has been previously selected by users within the threshold value may correspond to entity sets that are associated with the first entity. On the contrary, the candidate entity sets that do not satisfy the threshold value may be entity sets that are not associated with the first entity (e.g., due to not enough users selecting the respective candidate entity set). In this way, as user behavior changes with respect to which entities are related to one another, the system may determine entity sets that are related to the first entity more accurately. As an example, at one point in time, users may believe a first entity and a second entity may not be related, but at a second point in time, users may feel a first entity and a second entity are related (e.g., due to entity mergers, one entity purchasing another entity, one entity entering the industry field of another entity, one entity providing a similar service as another entity, etc.).

In some embodiments, model subsystem 118 may train or configure one or more prediction models to facilitate one or more embodiments described herein. In some embodiments, such models may be used to determine entity sets that are related to a first entity. As an example, such models may be trained or configured to perform the foregoing functions by respectively mutually mapping input data and output data in nonlinear relationships based on learning (e.g., deep learning). Additionally, one or more pre-trained prediction models may be stored in model database 136. For example, model database 136 may store a plurality of machine learning models configured to generate predictions related to entity sets that are related to a first entity.

In some embodiments, the prediction models may include one or more neural networks or other machine learning models. As an example, neural networks may be based on a large collection of neural units (or artificial neurons). Neural networks may loosely mimic the manner in which a biological brain works (e.g., via large clusters of biological neurons connected by axons). Each neural unit of a neural network may be connected with many other neural units of the neural network. Such connections can be enforcing or inhibitory in their effect on the activation state of connected neural units. In some embodiments, each individual neural unit may have a summation function which combines the values of all its inputs together. In some embodiments, each connection (or the neural unit itself) may have a threshold function such that the signal must surpass the threshold before it propagates to other neural units. These neural network systems may be self-learning and trained, rather than explicitly programmed, and can perform significantly better in certain areas of problem solving, as compared to traditional computer programs. In some embodiments, neural networks may include multiple layers (e.g., where a signal path traverses from front layers to back layers). In some embodiments, backpropagation techniques may be utilized by the neural networks, where forward stimulation is used to reset weights on the "front" neural units. In some embodiments, stimulation and inhibition for neural networks may be more free-flowing, with connections interacting in a more chaotic and complex fashion.

Figure 3:
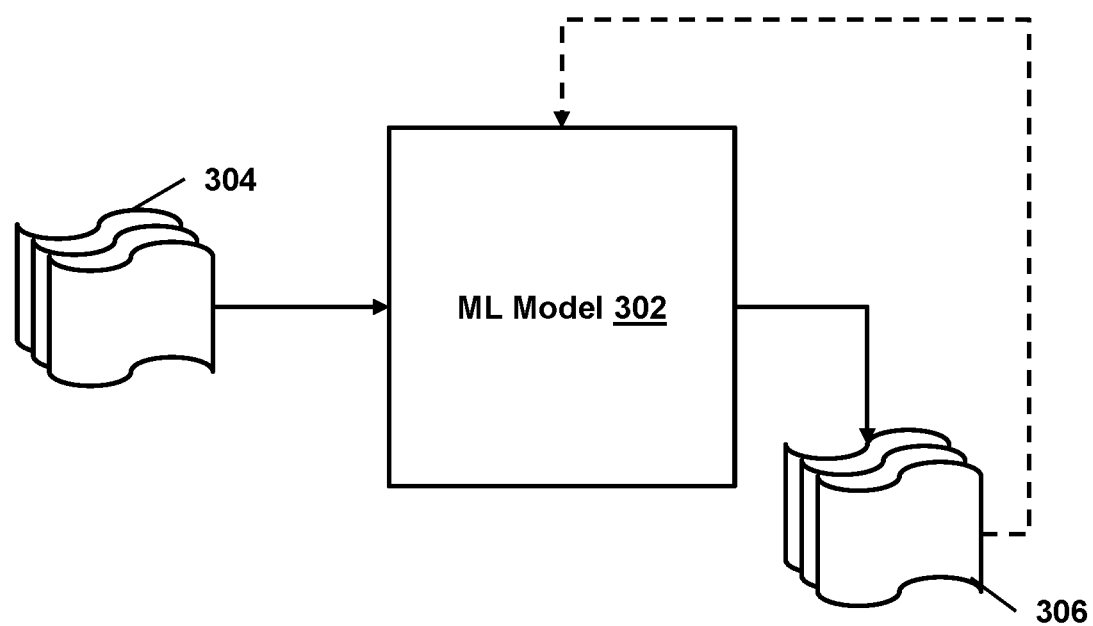
FIG. 3 shows a machine learning model configured to facilitate binding of an entity-restricted access token to an entity set, in accordance with one or more embodiments.

As an example, with respect to FIG. 3, machine learning model 302 may take inputs 304 and provide outputs 306. In one use case, outputs 306 may be fed back to machine learning model 302 as input to train machine learning model 302 (e.g., alone or in conjunction with user indications of the accuracy of outputs 306, labels associated with the inputs, or with other reference feedback information). In another use case, machine learning model 302 may update its configurations (e.g., weights, biases, or other parameters) based on its assessment of its prediction (e.g., outputs 306) and reference feedback information (e.g., user indication of accuracy, reference labels, or other information). In another use case, where machine learning model 302 is a neural network, connection weights may be adjusted to reconcile differences between the neural network's prediction and the reference feedback. In a further use case, one or more neurons (or nodes) of the neural network may require that their respective errors are sent backward through the neural network to them to facilitate the update process (e.g., backpropagation of error). Updates to the connection weights may, for example, be reflective of the magnitude of error propagated backward after a forward pass has been completed. In this way, for example, the machine learning model 302 may be trained to generate better predictions.

As an example, where the prediction models include a neural network, the neural network may include one or more input layers, hidden layers, and output layers. The input and output layers may respectively include one or more nodes, and the hidden layers may each include a plurality of nodes. When an overall neural network includes multiple portions trained for different objectives, there may or may not be input layers or output layers between the different portions. The neural network may also include different input layers to receive various input data. Also, in differing examples, data may be input to the input layer in various forms, and, in various dimensional forms, may be input to respective nodes of the input layer of the neural network. In the neural network, nodes of layers other than the output layer are connected to nodes of a subsequent layer through links for transmitting output signals or information from the current layer to the subsequent layer, for example. The number of links may correspond to the number of nodes included in the subsequent layer. For example, in adjacent fully connected layers, each node of a current layer may have a respective link to each node of the subsequent layer, noting that in some examples such full connections may later be pruned or minimized during training or optimization. In a recurrent structure, a node of a layer may be again input to the same node or layer at a subsequent time, while in a bi-directional structure, forward and backward connections may be provided. The links are also referred to as connections or connection weights, as referring to the hardware implemented connections or the corresponding "connection weights" provided by those connections of the neural network. During training and implementation such connections and connection weights may be selectively implemented, removed, and varied to generate or obtain a resultant neural network that is thereby trained and that may be correspondingly implemented for the trained objective, such as for any of the above example recognition objectives.

In some embodiments, machine learning model 302 may be trained based on entity data database 134 to generate predictions related to entity sets that are associated with a first entity. For example, as discussed above, entity data database 134 may include entity information, entity association information (e.g., entities that are associated with one another), or other entity-related information. In some embodiments, machine learning model 302 may be trained on entity information from entity data database 134. For instance, machine learning model 302 may take an entity as input 304, and generate a set of entities as outputs 306 that are related to (or otherwise associated with) the entity provided as input 304. In some embodiments, machine learning model 302 may take an entity as input 304 and generate a plurality of entity sets that are associated with the entity as outputs 306. In some embodiments, the generated set of entities may be fed back into machine learning model 302 to update one or more configurations (e.g., weights, biases, or other parameters) based on its assessment of its prediction (e.g., outputs 306) and reference feedback information (e.g., user indication of accuracy, reference labels, or other information).

As an example, referring back to FIG. 1, in some embodiments, model subsystem 118 may provide training data to a prediction model to train a prediction model. For instance, in some embodiments, model subsystem 118 may obtain a prediction model (e.g., a machine learning model) from model database 136. In such a case, model subsystem 118 may train the selected prediction model based on training data (e.g., entity information) stored in entity data database 134. Once the prediction model is trained, entity subsystem 114 may provide a first entity as input to the prediction model to generate a first entity set that is associated with the first entity. For example, entity subsystem 114 may provide an entity parameter, such as an entity identifier to the prediction model. The prediction model may generate sets of entities that are associated with the first entity as outputs. For instance, where the first entity is a merchant, the prediction model may generate a set of other merchants that are associated with the merchant.

In some embodiments, message subsystem 116 may cause a message to be presented at a user device associated with the user based on the detection of use of the entity-restricted access token. As an example, the user device may correspond to client device 104. Token subsystem 112 may detect the use of an entity-restricted access token for an action related to a first entity. Based on the detection of use, token subsystem 112 may communicate with message subsystem 116 to generate a message to be presented at the user device. For example, the message may include entity sets that have been determined to be associated with the first entity (e.g., as described above). In some embodiments, the message may be a text message (e.g., SMS message), a notification, a mobile notification, a push notification, an email, or other message. The message may also request a user selection of entity sets to which the entity-restricted access token is to be bound. For example, the message may include user-selectable options that include at least one entity set and a decline option (e.g., an option indicating that no entity set is to be bound to the entity-restricted access token). In this way, the user has the choice of configuring the entity-restricted access token to their liking, overcoming the drawbacks of having to manually configure each entity-restricted access token.

In some embodiments, the user may select an entity set (or entity sets) to be bound to the entity-restricted access token or, alternatively, the user may select the decline option via a long press, a tap, a swipe (e.g., a swipe up, a swipe down, a swipe to the left, a swipe to the right, etc.), a geometric pattern, or other selection method. Alternatively, the user may also select the decline option indicating that none of the determined entity sets are to be bound to the entity-restricted access token. Message subsystem 116 may then detect the user selection and provide the user selection to token subsystem 112.

In some embodiments, token subsystem 112 may bind, based on the user selection obtained via the message, the entity-restricted access token to the user-selected entity set. For example, where the user has selected at least one entity set to be bound to the entity-restricted access token, token subsystem 112 may receive the user selection from message subsystem 116 and cause the selected entity sets to be bound to the entity-restricted access token. In this way, the entity-restricted access token may be used for subsequent actions with the entities included in the user-selected entity set.

In some embodiments, token subsystem 112 may interact with token vault subsystem 120 to store the entity-restricted access token in token vault subsystem 120. As an example, in a case where the entity-restricted access token is newly generated, the entity-restricted access token may be stored in token vault subsystem 120 for subsequent use, in accordance with one or more embodiments. Additionally, in the case where the entity-restricted access token is newly generated (e.g., there are no entities currently bound), the binding of the user-selected entities may replace any null entity parameters with parameters of the newly bound entity (e.g., the entity identifier, or other entity parameters). Alternatively, where the entity-restricted access token is a previously generated entity-restricted access token, token subsystem 112 may interact with token vault subsystem 120 to update entity information associated with the entity-restricted access token. For example, the previously generated entity-restricted access token may be updated to reflect which entities are bound to the entity-restricted access token.

In one use case, where the entity-restricted access token is a virtual card number, a user may select, via a message presented to the user, one or more merchants that are associated with a merchant with which the user is currently attempting to purchase an item. Based on the user selection, the virtual card number may be bound to the user-selected merchants where any subsequent use of the virtual card number will be restricted to those user-selected merchants. In this way, the user experience may be improved based on the user no longer needing to manually configure the virtual card number with each entity the user wishes to restrict transactions to. For instance, the virtual card number may simply "work" when a user attempts to interact (e.g., make a purchase, complete a transaction, etc.) with another merchant that is related to or otherwise associated with the merchant with which the user is currently interacting.

In some embodiments, entity subsystem 114 may update entity data based on a value of previous user selections. For instance, as entity data includes information pertaining to which entities are associated with one another, and such entity data may be used as training data for machine learning models, entity subsystem 114 may update entity data (and therefore, training data for machine learning models) based on a value of previous user selections. For instance, due to the vast intricacies of determining which entities are related to one another, the system may also rely on user feedback (e.g., previous user selections) to determine which entities are associated with one another. As an example, although one entity may not be a part of another entity's organization (e.g., owned by, affiliated with, etc.), users may nonetheless associate those entities with each other, thereby creating the impression that the entity-restricted access token should "work" when performing actions with those entities. Additionally, as time progresses and user behavior changes, so may the associations between one entity and another entity. Therefore, when an entity set is selected by the user, entity data database 134 may be updated to reflect current user behavior (e.g., indications of which entities are associated with one another). However, to prevent errors regarding which entities are associated with other entities, the system may update entity data database 134 when a user-selection threshold value is satisfied, thereby maintaining a level of accuracy of the entity association information.

For example, in some embodiments, entity subsystem 114 may determine, based on a user-selected entity set, a number of previous user selections of the entities included in the user-selected entity set. For example, as a user is interacting with a first entity (e.g., to log in, purchase an item from the entity, etc.), based on a user selection of an entity set that is associated with the first entity, entity subsystem 114 may determine how many previous user selections by other users have selected the entity set (and the entities included in the entity set) with respect to the first entity. For instance, where the user is purchasing an item from a first merchant's website, when the user selects a set of other merchants that are associated with the first merchant, entity subsystem 114 may interact with entity data database 134 to retrieve a number of previous user selections for each of the entities included in the entity set. Entity subsystem 114 may determine whether the retrieved number of previous user selections of the entities included in the entity set satisfies a selection threshold number. For example, the selection threshold number may be a number of previous user selections, a percentage of previous user selections, a ratio of previous user selections, or other value with respect to the first entity (e.g., merchant). In response to the number of previous user selections of the user-selected entity set satisfying the selection threshold number, entity subsystem 114 may update entity data database 134 to reflect these changes. For example, the selection threshold number may be a predetermined number, percentage, ratio, number range, percentage range, ratio range, or other value or range of previous user selections of the user-selected entity set with respect to the first entity. In some embodiments, the selection threshold number may be satisfied if the number of previous user selections meets or exceeds the selection threshold number or is within the selection threshold number range. In this way, subsequent determinations of which entities are associated with one another may be effectuated by having more up-to-date entity data on which to base such determinations.

For example, entity data database 134 may store a log of values for each entity indicating how many times a user has selected an entity to be bound to the entity-restricted access token with respect to another entity. Additionally, entity data database 134 may store a data structure (e.g., a list, graph, ontology, tree structure, etc.) indicating which entities are associated with one another. Entity subsystem 114 may determine whether the number of previous user selections of the entities included in the user-selected entity set satisfies a selection threshold number. Based on such determination, entity subsystem 114 may update the entity data stored in entity data database 134 to reflect the determination. For example, if the selection threshold number is satisfied (e.g., meets or exceeds the selection threshold number, is within a range of the selection threshold number), entity subsystem 114 may update a list (e.g., storing entities that are associated with one another) to associate the entities included in the user-selected entity set with the entity the user is currently interacting with that satisfies the selection threshold number. Alternatively or additionally, entity subsystem 114 may update the entity data to add a value (e.g., a number) indicating a number of user selections of the first entity being associated with each of the entities included in the user-selected entity set. For example, when the selection threshold number is satisfied, entity subsystem 114 may add to a counter variable for each of the user-selected entities that the first entity is associated with, with respect to each of the user-selected entities. When the user-selection threshold value is not satisfied, entity subsystem 114 may update the counter variable, but may not update the list indicating that the first entity is associated with the respective user-selected entity. In this way, entity association information may be dynamically updated based on user feedback, therefore reflecting more accurate entity association information. Additionally, as the entity data database 134 is updated to reflect these changes, any machine learning models trained on such data may also have more accurate training data—thus leading to more accurate entity association predictions.

In some embodiments, entity subsystem 114 may update entity data based on a value of previous user selections indicating that no entities included in the entity sets are to be bound to the entity-restricted access token. For example, entity subsystem 114 may determine from message subsystem 116 an indication that no entity included in the presented entity sets is to be bound to the entity-restricted access token with respect to a first entity. For example, as at least one entity set that is associated with a first entity is presented to the user via a message, when a user selects a decline option indicating that no entity set is to be bound to the entity-restricted access token, entity subsystem 114 may update entity data database 134 to reflect that the presented entity sets (and the entities included in the entity sets) are not associated with the first entity. In this way, entity data database 134 may be updated to reflect the most current user feedback indicating which entities are associated with one another to later provide more accurate entity association predictions or more accurate associated entity sets, thereby further improving the user experience.

In some embodiments, entity subsystem 114 may determine a number of previous user selections indicating that none of the entities included in the entity sets are to be bound to the entity-restricted access token. For example, entity data database 134 may store a log of values indicating how many times a user has declined the first entity from being associated with any of the entities included in the presented entity sets. Additionally, as mentioned above, entity data database 134 may store a data structure (e.g., a list, graph, ontology, tree structure, etc.) indicating which entities are associated with one another. Entity subsystem 114 may then determine whether the number of previous user selections indicating that none of the entities are to be bound to the entity-restricted access token satisfies a selection threshold number, and based on such determination, may update the entity data to reflect the determination. For example, if the selection threshold number is satisfied (e.g., meets or exceeds the selection threshold number, is within a range of the selection threshold number), entity subsystem 114 may update the entity data to disassociate the presented entity set (e.g., in the message presented to the user) from the entity with which the user is currently interacting. For example, entity subsystem 114 may update a list (e.g., storing entities that are associated with one another) to disassociate the entities presented to the user with respect to the first entity. Alternatively or additionally, entity subsystem 114 may update the entity data to add a value (e.g., a number) indicating that the first entity is not associated with another entity. For example, when the selection threshold number is not satisfied, entity subsystem 114 may add to a counter variable for each of the presented entities that the first entity is not associated with each of the presented entities, but may not update the list indicating that the first entity is not associated with the presented entities. In this way, entity association information may be further dynamically updated based on user feedback, therefore reflecting more accurate entity association information. Additionally, as the entity data database 134 is updated to reflect these changes, any machine learning models trained on such data may also have more accurate training data—thus leading to more accurate entity association predictions.

In some embodiments, token subsystem 112 may detect use of the entity-restricted access token for actions related to a second entity that is not part of the first entity set. For example, where the entity-restricted access token is a virtual card number, after the virtual card number has been bound to an entity set, a user may attempt to purchase an item from a merchant that is not currently bound to the virtual card number. Based on a determination that the action related to the second entity is invalid, an error candidate indication of an action error related to the first entity set may be stored. For example, because the virtual card number will prevent the user from purchasing the item from the merchant that is not currently bound (e.g., the action is invalid), entity subsystem 114 may store an error candidate indication in entity data database 134. For instance, although the virtual card number may prevent the purchase attempt, the user may nonetheless want to log in to purchase the item. As such, the user may request to bind the merchant to the virtual card number. Thus, entity subsystem 114 may update, based on the stored error candidate indication, the first entity set associated with the first entity. For example, the virtual card number may be bound to the merchant, as well as to the other merchants previously bound to the virtual card number. In some embodiments, in response to the updating of the first entity set, the action related to the newly bound entity may be performed. For example, the user may purchase the item from the merchant that has recently been bound to the virtual card number.

Example Flowchart

Figure 4:
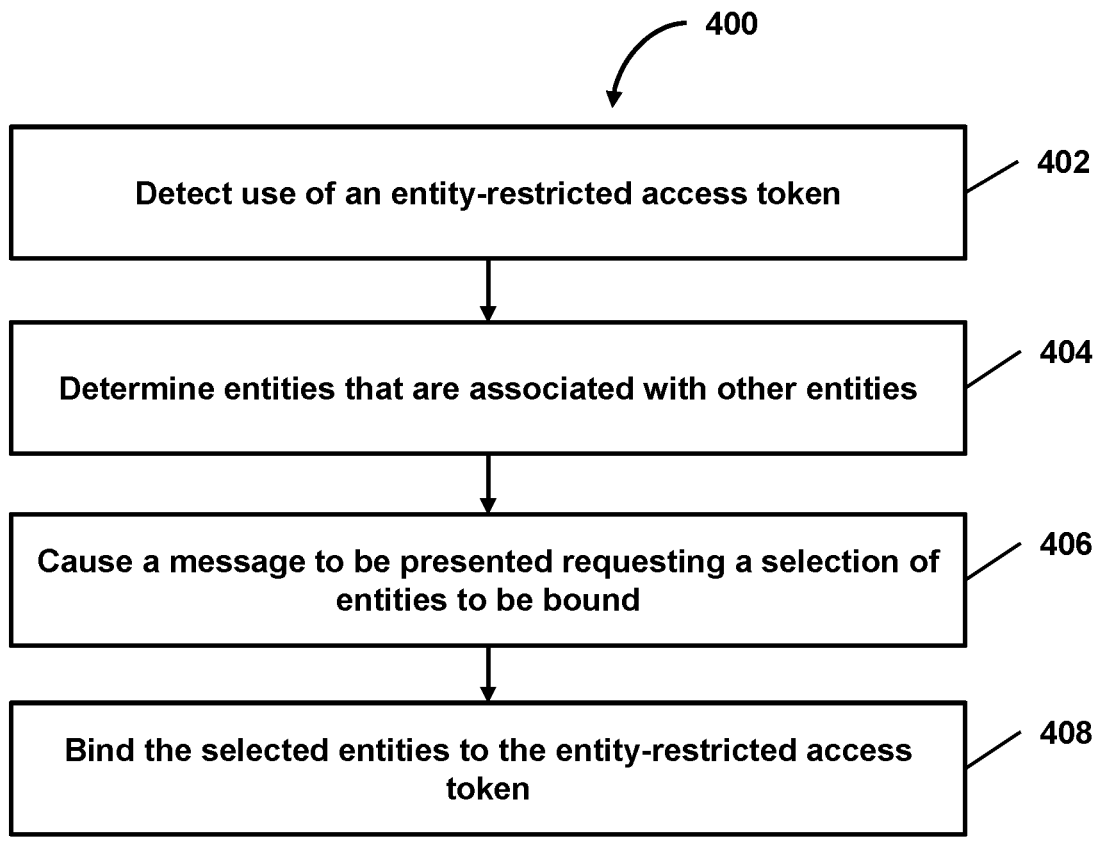
FIG. 4 shows a flowchart of a method for binding an entity-restricted access token to an entity set, in accordance with one or more embodiments.

FIG. 4 is an example flowchart of processing operations of a method 400 that enable the various features and functionality of the system as described in detail above. The processing operations of the method presented below are intended to be illustrative and non-limiting. In some embodiments, for example, the method may be accomplished with one or more additional operations not described, and/or without one or more of the operations discussed. Additionally, the order in which the processing operations of the method are illustrated (and described below) is not intended to be limiting.

In some embodiments, the method may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on an electronic storage medium. The processing devices may include one or more devices configured through hardware, firmware, and/or software to be specifically designed for execution of one or more of the operations of the methods.

In an operation 402, use of an entity-restricted access token may be detected. As an example, use of the entity-restricted access token may be detected for an action related to a first entity. For instance, the action may be any interaction with an entity (e.g., logging in to an entity, purchasing an item from an entity, accessing entity account information, etc.). A first entity may be a service provider, a merchant, an entity associated with a website, or other entity. Operation 402 may be performed by a subsystem that is the same as or similar to token subsystem 112, in accordance with one or more embodiments.

In an operation 404, entities that are associated with other entities may be determined. As an example, a first entity set that is associated with a first entity may be determined. For instance, entities of the first entity set may include entities that are associated with the first entity. For example, entities that are associated with the first entity may include entities that are owned by the first entity, entities that are partially owned by the first entity, entities that provide similar services with respect to the first entity, websites associated with entities that are associated with the first entity, or entities that are otherwise associated with the first entity. In some embodiments, the first entity set may include the first entity. For example, where the first entity is associated with a website, the first entity set may include the first entity associated with the website and other entities associated with websites that are associated with the first entity. As another example, where the first entity is a merchant, the first entity set may include the merchant and other merchants that are associated with the merchant. Operation 404 may be performed by a subsystem that is the same as or similar to entity subsystem 114, in accordance with one or more embodiments.

In an operation 406, a message may be caused to be presented requesting a selection of entities to be bound. For example, based on the detection of the use of the entity-restricted access token, a message may be caused to be presented at a mobile device of the user. As an example, the message may be a text message (e.g., SMS message), an email, a notification, a mobile notification, a push notification, or any other message. As another example, the message may include the first entity set and request a user selection of an entity or an entity set to which the entity-restricted access token is to be bound. In some embodiments, the message may also include a decline option indicating that no entities are to be bound to the entity-restricted access token. Operation 406 may be performed by a subsystem that is the same as or similar to message subsystem 116, in accordance with one or more embodiments.

In an operation 408, the selected entities may be bound to the entity-restricted access token. As an example, based on the user selection obtained via the message, the entity-restricted access token may be bound to the user-selected entity set. In this way, subsequent use of the entity-restricted access token may be restricted to actions related to entities of the user-selected entity set. Operation 408 may be performed by a subsystem that is the same as or similar to token subsystem 112, in accordance with one or more embodiments.

In some embodiments, the various computers and subsystems illustrated in FIG. 1 may include one or more computing devices that are programmed to perform the functions described herein. The computing devices may include one or more electronic storages (e.g., database(s) 132, which may include entity data database(s) 134, model database(s) 136, etc., or other electronic storages), one or more physical processors programmed with one or more computer program instructions, and/or other components. The computing devices may include communication lines or ports to enable the exchange of information within a network (e.g., network 150) or other computing platforms via wired or wireless techniques (e.g., Ethernet, fiber optics, coaxial cable, WiFi, Bluetooth, near field communication, or other technologies). The computing devices may include a plurality of hardware, software, and/or firmware components operating together. For example, the computing devices may be implemented by a cloud of computing platforms operating together as the computing devices.

The electronic storages may include non-transitory storage media that electronically stores information. The storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent processing functionality of a plurality of devices operating in coordination. The processors may be programmed to execute computer program instructions to perform functions described herein of subsystems 112-120 or other subsystems. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems 112-120 described herein is for illustrative purposes, and is not intended to be limiting, as any of subsystems 112-120 may provide more or less functionality than is described. For example, one or more of subsystems 112-120 may be eliminated, and some or all of its functionality may be provided by other ones of subsystems 112-120. As another example, additional subsystems may be programmed to perform some or all of the functionality attributed herein to one of subsystems 112-120.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The present techniques will be better understood with reference to the following enumerated embodiments:

1. A method comprising: detecting use of a token for an action related to a first entity; determining a first entity set associated with the first entity, wherein the first entity set comprises the first entity; causing, based on the detection of the use of the token, a message to be presented at a user device associated with the user, the message indicating the first entity set and requesting a user selection of an entity set to which the token is to be bound; and binding, based on the user selection obtained via the message, the token to the user-selected entity set such that subsequent use of the token is restricted to actions related to entities of the user-selected entity set.

2. The method of the preceding embodiment, further comprising: providing training data to a prediction model to train the prediction model, wherein the training data comprises information indicating related entities (e.g., entities that are associated with one another); and providing the first entity as input to the prediction model to generate (or otherwise determine) the first entity set associated with the first entity.

3. The method of the preceding embodiment, further comprising: updating the training data based on a value of previous user selections of the entities included in the user-selected entity set satisfying a selection threshold value.

4. The method of embodiment 2, further comprising: updating the training data based on a value of previous user selections indicating that none of the entities included in the entity sets are to be bound to the token satisfying a selection threshold value.

5. The method of any of the preceding embodiments, further comprising: determining the first entity set associated with the first entity based on a value of previous user selections of user-selected entity sets satisfying a selection threshold value.

6. The method of any of the preceding embodiments, further comprising: updating the first entity set associated with the first entity based on a value of previous user selections indicating that none of the entities included in the entity sets are to be bound to the token satisfying a selection threshold metric.

7. The method of any of the preceding embodiments, further comprising: identifying a set of bound entities that are bound to the token; determining whether the first entity is associated with at least one of the set of bound entities; and in response to the first entity being associated with at least one of the set of bound entities, performing the action related to the first entity.

8. The method of any of the preceding embodiments, wherein the message comprises user-selectable options comprising (i) at least one entity set and (ii) a decline option.

9. The method of any of the preceding embodiments, further comprising: detecting use of the token for an action related to a second entity that is not part of the first entity set; storing, based on a determination that the action related to the second entity is invalid, an error candidate indication of an action error related to the first entity set; and updating, based on the stored error candidate indication, the first entity set associated with the first entity.

10. The method of the preceding embodiment, further comprising: in response to the updating of the first entity set associated with the first entity, performing the action related to the second entity.

11. The method of any of the preceding embodiments, wherein the token comprises an entity-restricted access token.

12. A tangible, non-transitory, machine-readable medium storing instructions that, when executed by a data processing apparatus, cause the data processing apparatus to perform operations comprising those of any of the foregoing method embodiments.

13. A system comprising: one or more processors; and memory storing instructions that, when executed by the processors, cause the processors to effectuate operations comprising those of any of the foregoing method embodiments.

What is claimed is:

1. A token generation and authentication system for binding entity-restricted access tokens to an entity set derived from network operation error monitoring, the system comprising:

one or more processors programmed with computer program instructions that, when executed, cause operations comprising:
in response to (i) network use, via a website associated with a first third-party entity, of an entity-restricted access token having a null entity value for an entity parameter of the entity-restricted access token and (ii) computer parsing of a uniform resource locator of the website, determining a plurality of entity sets associated with the first third-party entity with which a first network operation of a user is used, wherein at least one entity set of the plurality of entity sets comprises the first third-party entity and one or more additional entities related to the first third-party entity;

causing, on a mobile display of a mobile device of the user, presentation of a mobile notification requesting a user selection of an entity set from among the plurality of entity sets to which the entity-restricted access token is to be bound;

binding, based on a user interaction indicating a user selection of a user-selected entity set obtained via the mobile notification presented on the mobile display, the entity-restricted access token to the user-selected entity set in a token vault system, the binding in the token vault system replacing the null entity value with one or more entity values corresponding to the user-selected entity set such that subsequent use of the entity-restricted access token is restricted to network operations with entities of the user-selected entity set;

after the binding of the entity-restricted access token in the token vault system, obtaining, via a network, a request for a second network operation of the user with a second third-party entity that is not part of the user-selected entity set, the request indicating network use of the entity-restricted access token for the second network operation via a network;

storing, based on validation of the second network operation indicating that the second network operation is invalid, in one or more databases, an error candidate indication of a network operation error related to the user-selected entity set;

updating, based on the stored error candidate indication, the user-selected entity set in an entity database to include the second third-party entity; and in response to updating the user-selected entity set to include the second third-party entity, performing the second network operation via a network.

2. A computer-implemented method comprising:

detecting, via a network, use of an entity-restricted access token for an action performed on a website related to a first entity associated with a plurality of entity sets, wherein at least one entity set of the plurality of entity sets comprises the first entity and one or more additional entities related to the first entity;

causing, based on the network detection of the use of the entity-restricted access token and parsing of a uniform resource locator of the website, on display of a user device of a user, presentation of an user interface notification requesting a user selection of an entity set from among the plurality of entity sets to which the entity-restricted access token is to be bound;

binding, based on a user selection of a user-selected entity-set obtained via the user interface notification, the entity-restricted access token to the user-selected entity set in a token vault system such that subsequent use of the entity-restricted access token is restricted to actions related to entities of the user-selected entity set; and in response to detecting, via a network, that a second detected use of the entity-restricted access token for a second action related to a second entity is not part of the user-selected entity set, preventing performance of the second action related to the second entity.

3. The method of claim 2, comprising:

providing training data to a prediction model to train the prediction model, wherein the training data comprises user feedback indicating related entities; and providing the first entity as input to the prediction model to generate the plurality of entity sets associated with the first entity.

4. The method of claim 3, further comprising:

determining, based on the user-selected entity set, a number of previous user selections of the entities included in the user-selected entity set;

determining whether the number of previous user selections of the entities satisfies a selection threshold number; and updating the training data based on the number of previous user selections of the entities satisfying the selection threshold number.

5. The method of claim 3, further comprising:

determining, based on the user-selected entity set, an indication that none of the entities included in the entity sets of the plurality of entity sets are to be bound to the entity-restricted access token;

determining a number of previous user selections indicating that none of the entities included in the entity sets of the plurality of entity sets are to be bound to the entity-restricted access token;

determining whether the number of previous user selections satisfies a selection threshold number; and updating the training data based on the number of previous user selections satisfying the selection threshold number.

6. The method of claim 2, further comprising:

retrieving, based on the first entity, a plurality of candidate entity sets, wherein at least one candidate entity set of the plurality of candidate entity sets comprises the first entity and one or more additional entities related to the first entity set;

identifying, for each of the plurality of candidate entity sets, a number of previous user selections;

determining, for each of the plurality of candidate entity sets, whether the number of previous user selections of the candidate entity set satisfies a selection threshold number; and determining the plurality of entity sets associated with the first entity based on the number of previous user selections of the respective candidate entity sets satisfying the selection threshold number.

7. The method of claim 2, further comprising:

determining, based on the user-selected entity set, an indication that none of the entities included in the entity sets of the plurality of entity sets are to be bound to the entity-restricted access token;

determining a number of previous user selections indicating that none of the entities included in the entity sets of the plurality of entity sets are to be bound to the entity-restricted access token;

determining whether the number of previous user selections satisfies a selection threshold number; and updating the plurality of entity sets associated with the first entity based on the number of previous user selections satisfying the selection threshold number.

8. The method of claim 2, further comprising:

identifying a set of bound entities that are bound to the entity-restricted access token;

determining whether the first entity is associated with at least one entity of the set of bound entities; and in response to the first entity being associated with at least one entity of the set of bound entities, performing the action related to the first entity.

9. The method of claim 2, wherein the notification comprises a plurality of user-selectable options comprising: (i) at least one entity set of the plurality of entity sets to which the entity-restricted access token is to be bound and (ii) a decline option indicating that no entity set of the plurality of entity sets is to be bound.

10. The method of claim 2, further comprising:

detecting use of the entity-restricted access token for an action related to a second entity that is not part of any of the plurality of entity sets;

storing, based on a determination that the action related to the second entity is invalid, an error candidate indication of an action error related to the user-selected entity set; and updating, based on the stored error candidate indication, the plurality of entity sets associated with the first entity.

11. One or more non-transitory computer-readable media comprising instructions that, when executed by one or more processors, cause operations comprising:
- detecting, via a network, use of an entity-restricted access token for an action related to a first entity;
- determining a first entity set associated with the first entity, wherein the first entity set comprises the first entity;
- causing, based on the network detection of the use of the entity-restricted access token, presentation of a notification at a user device of a user, the notification indicating the first entity set and requesting a user selection of an entity set to which the entity-restricted access token is to be bound;
- binding, based on a user selection of a user-selected entity set obtained via the notification, the entity-restricted access token to the user-selected entity set in a token database such that subsequent use of the entity-restricted access token is restricted to actions related to entities of the user-selected entity set; and
- based on a second network detection of use of the entity-restricted access token for a second action related to a second entity that is not part of the user-selected entity set, preventing performance of the second action related to the second entity.

12. The non-transitory computer-readable media of claim 11, wherein determining the first entity set associated with the first entity further comprises:
- providing training data to a prediction model to train the prediction model, wherein the training data comprises user feedback indicating associated entities; and
- providing the first entity as input to the prediction model to generate the first entity set associated with the first entity.

13. The non-transitory computer-readable media of claim 12, the operations further comprising:
- determining, based on the user-selected entity set, a number of previous user selections of the entities included in the user-selected entity set;
- determining whether the number of previous user selections of the entities satisfies a selection threshold number; and
- updating the training data based on the number of previous user selections of the entities satisfying the selection threshold number.

14. The non-transitory computer-readable media of claim 12, the operations further comprising:
- determining, based on the user-selected entity set, an indication that none of the entities included in the entity set are to be bound to the entity-restricted access token;
- determining a number of previous user selections indicating that none of the entities included in the entity set are to be bound to the entity-restricted access token;
- determining whether the number of previous user selections satisfies a selection threshold number; and
- updating the training data based on the number of previous user selections satisfying the selection threshold number.

15. The non-transitory computer-readable media of claim 11, the operations further comprising:
- retrieving, based on the first entity, a plurality of candidate entity sets, wherein at least one candidate entity set of the plurality of candidate entity sets comprises the first entity and one or more additional entities related to the first entity set;
- identifying, for each of the plurality of candidate entity sets, a number of previous user selections;
- determining, for each of the plurality of candidate entity sets, whether the number of previous user selections of the candidate entity set satisfies a selection threshold number; and
- determining the first entity set based on the number of previous user selections of the respective candidate entity sets satisfying the selection threshold number.

16. The non-transitory computer-readable media of claim 11, the operations further comprising:
- determining, based on the user-selected entity set, an indication that none of the entities included in the entity set are to be bound to the entity-restricted access token;
- determining a number of previous user selections indicating that none of the entities included in the entity set are to be bound to the entity-restricted access token;
- determining whether the number of previous user selections satisfies a selection threshold number; and
- updating the first entity set based on the number of previous user selections satisfying the selection threshold number.

17. The non-transitory computer-readable media of claim 11, the operations further comprising:
- identifying a set of bound entities that are bound to the entity-restricted access token;
- determining whether the first entity is associated with at least one entity of the set of bound entities; and
- in response to the first entity being associated with at least one entity of the set of bound entities, performing the action related to the first entity.

18. The non-transitory computer-readable media of claim 11, wherein the notification comprises a plurality of user-selectable options comprising: (i) at least one entity set to which the entity-restricted access token is to be bound and (ii) a decline option indicating that no entity set is to be bound to the entity-restricted access token.

19. The non-transitory computer-readable media of claim 11, the operations further comprising:
- detecting use of the entity-restricted access token for an action related to a second entity that is not part of the first entity set;
- storing, based on a determination that the action related to the second entity is invalid, an error candidate indication of an action error related to the first entity set; and
- updating, based on the stored error candidate indication, the first entity set.

20. The non-transitory computer-readable media of claim 19, the operations further comprising:
- in response to the updating of the first entity set, performing the action related to the second entity.

* * * * *